(12) United States Patent
Zhao

(10) Patent No.: US 10,945,387 B2
(45) Date of Patent: Mar. 16, 2021

(54) DEVICE FOR PLANTS SURVIVAL AND GROWTH ENHANCEMENT

(71) Applicant: Yuncheng Qinghai Science & Technology Co., Ltd., Shanxi (CN)

(72) Inventor: Shuhai Zhao, Yuncheng (CN)

(73) Assignee: Yunchen Qinghai Science Technology Co., Ltd., Shanxi (CN)

( * ) Notice: Subject to any disclaimer, the term of this patent is extended or adjusted under 35 U.S.C. 154(b) by 230 days.

(21) Appl. No.: 16/082,904

(22) PCT Filed: May 17, 2017

(86) PCT No.: PCT/CN2017/084711
§ 371 (c)(1),
(2) Date: Sep. 6, 2018

(87) PCT Pub. No.: WO2018/049833
PCT Pub. Date: Mar. 22, 2018

(65) Prior Publication Data
US 2019/0090439 A1 Mar. 28, 2019

(30) Foreign Application Priority Data

Sep. 13, 2016 (CN) .......................... 201610818338.7

(51) Int. Cl.
*A01G 25/02* (2006.01)
*A01G 29/00* (2006.01)
(Continued)

(52) U.S. Cl.
CPC ............. *A01G 25/02* (2013.01); *A01G 25/06* (2013.01); *A01G 27/008* (2013.01); *A01G 27/04* (2013.01); *A01G 27/06* (2013.01); *A01G 29/00* (2013.01)

(58) Field of Classification Search
CPC ...... A01G 25/02; A01G 25/06; A01G 27/008; A01G 29/00; A01G 27/06; A01G 27/04;
(Continued)

(56) References Cited

U.S. PATENT DOCUMENTS 4,087,938 A 5/1978 Koch
5,975,797 A * 11/1999 Thomas ................. A01G 25/06
405/36
(Continued)

FOREIGN PATENT DOCUMENTS

CN 203261938 U 11/2013
CN 138713.8 A 9/2016
CN 206118683 U 4/2017

OTHER PUBLICATIONS

International Search Report re International Patent Application No. PCT/CN2017/084711.

*Primary Examiner* — Timothy D Collins
*Assistant Examiner* — Brittany A Lowery
(74) *Attorney, Agent, or Firm* — Foley & Lardner LLP

(57) ABSTRACT

The disclosed device includes a water storage container, an evaporation cover, a funnel, an indicator rod and a float. The water storage container has an evaporation cover. The evaporation cover is a gas permeable structure. A funnel is connected to the evaporation cover and an indication is provided in the leakage tube of the funnel. A rod. A float is connected to the lower end of the indicator rod and the float drives the indicator rod to indicate the water level in the water storage container. The method is as follows: the water storage container and the evaporation cover are buried in the soil of the plant root, and the water is filled into the water storage container through the funnel. The water in the water container naturally evaporates into the soil through the
(Continued)

evaporation hood, which maintains the water in the soil to maintain the survival of the plant.

4 Claims, 30 Drawing Sheets

(51) Int. Cl.
*A01G 27/06* (2006.01)
*A01G 25/06* (2006.01)
*A01G 27/00* (2006.01)
*A01G 27/04* (2006.01)

(58) Field of Classification Search
CPC .... A01D 34/902; A01D 34/90; A01D 85/004; A01D 41/1217; A01D 2101/00; A01D 34/475; A01D 34/63; A01D 45/00; A01D 46/247; A01D 57/20; A01D 84/00; A01D 89/008; A01D 90/00; A01D 90/12; A01D 2085/007; A01D 33/04; A01D 33/10; A01D 34/04; A01D 34/07; A01D 34/416; A01D 34/67; A01D 34/824; A01D 34/8355; A01D 34/866; A01D 37/00; A01D 43/0635; A01D 44/00; A01D 45/006; A01D 45/16; A01D 45/30; A01D 46/08; A01D 46/082; A01D 46/084; A01D 46/10; A01D 46/20; A01D 46/285; A01D 47/00; A01D 57/01; A01D 57/04; A01D 57/12; A01D 67/00; A01D 69/007; A01D 75/06; A01D 78/1078; A01D 78/146; A01D 7/00; A01D 7/04; A01D 7/06; A01D 85/005; A01D 90/02; A01D 90/10; A01D 90/105
See application file for complete search history.

(56) References Cited

U.S. PATENT DOCUMENTS

| | | | |
|---|---|---|---|
| 6,237,283 B1 | 5/2001 | Nalbandian et al. | |
| 6,662,493 B1* | 12/2003 | Bathey | A01G 29/00 47/48.5 |
| 2003/0017001 A1* | 1/2003 | Ogi | A01G 29/00 405/36 |
| 2007/0267515 A1* | 11/2007 | Sargent | A01G 27/006 239/63 |
| 2014/0020290 A1* | 1/2014 | Zinger | A01G 29/00 47/48.5 |

* cited by examiner

DEVICE FOR PLANTS SURVIVAL AND GROWTH ENHANCEMENT

CROSS REFERENCE TO RELATED APPLICATION

This application is a National Stage Entry of, claims priority to, and claims the benefit of International Patent Cooperation Treaty (PCT) Application Serial No. PCT/CN2017/084711 entitled "Device for Plants Survival and Growth Enhancement" and filed on 17 May 2017, which is incorporated herein by reference in its entirety for any purpose.

TECHNICAL FIELD

The invention relates to a device for ensuring plant survival during drought.

TECHNICAL BACKGROUND

Plants can die in drought for lack of water supply temporarily, regardless whether the plants are grown by men or naturally reproduced. For example, in some areas, 4 months without rain is sufficient to kill plants in the areas in large scale. In another example, a 2-month vacation can let plants at home die because no one waters them during the vacation. Some dry areas can only grow grass and not trees because of occasional water shortage. There are no trees in these dry areas because the trees have died due to a short period of drought. In such dry areas, produce trees such as fruit trees, poplars and pine trees cannot survive. In some other intermittent dry areas, because of drought, some land has become desert. As a result, plants cannot grow, even though intermittent natural rain could be sufficient for their growth, and the rain water is lost due to the lack of plants.

SUMMARY

The objective of the disclosed device is to overcome the above problems caused by drought. The disclosed device can improve the growth condition for plants and thus enhance their growth and ensure their survival.

The purpose of the disclosed device can be achieved by the following technical scheme.

A device for ensuring the survival of plants includes a water storage container, an evaporation net, a funnel, a indicating rod and a float. The water storage container is used for storing water, the upper part of the water storage container has an evaporation net, the evaporation net is a gas permeable structure, and the evaporation is performed. There is a funnel connected to the net. The leaking tube of the funnel is equipped with a indicating rod. There is a gap between the leaking tube of the funnel and the indicating rod. The lower end of the indicating rod extends to the water storage container and is connected with a float. The floating rod drives the indicating rod to indicate the inside of the water storage container water level. A conduit can also be used between the funnel and the evaporation net.

The method is as follows: the water storage container and the evaporation net are buried in the soil of the root of the plant, and the water is filled into the water storage container through the gap between the leaking tube of the funnel and the indicator rod, the float is floated to the water surface by the water, and the floating rod drives the indicator rod to rise. Indicate the water level in the water storage container. The indicator rod can be marked with a scale to indicate the level of the water level in the water storage container, and the water is filled until the water storage container is full. After that, the water in the water storage tank naturally evaporates into the soil through the evaporation net, and the water in the soil is maintained to maintain the survival of the plant. After the water storage container is filled with water, the natural evaporation time of 1-5 months or more can be maintained. The time is determined by the size of the water storage container, the temperature, and the amount of water absorbed by the plant. For example, the winter time is longer. During this period, the plants can be saved without watering.

As an optimization aspect, according to the above device for ensuring plant survival, the evaporation net cover has a gauze to prevent soil or sand from entering the water storage container.

As an optimization aspect, according to the above device for ensuring plant survival, the inside of the funnel has an inner threaded buckle. The filter is provided with a filter net, the lower end of the filter net has a thread buckle, and the filter net has an indicator rod passing through it. The funnel is connected to the evaporation net by a conduit, and the lower end of the conduit is connected with an elbow. The other end of the elbow has a check valve on the outlet to prevent water in the water storage container from evaporating to the atmosphere along the conduit, indicator rod and float connection.

As an optimization aspect, according to the above device for ensuring plant survival, the internal thread in the funnel is a tapered inner thread. The funnel is provided with a filter net, and the lower end of the filter has a tapered external thread.

In another general aspect, a method for using the disclosed device is as follows: the water storage container and the evaporation net are buried in the soil of the root of the plant, and the length of the conduit is adjusted according to the depth of the root of the plant. The funnel with the inner thread is slightly lower than the ground plane, so that the ground rain can flow into the water storage container. A plastic sheeting can be placed between the funnel and the filter. The plastic sheeting is laid into a funnel shape, and the rainwater is collected into the filter through the plastic sheeting, and flows into the water storage container through the filter hole, the funnel, and the conduit. The indicator rod indicates the water level of the water storage container. If the rainfall is too large, water that exceeds the water storage tank penetrates into the soil through the evaporation net. After the rain, the water in the water storage tank naturally evaporates into the soil through the evaporation net, and there is water in the soil, and the plants can survive. According to the size of the water storage container, the water in the water storage container can be maintained for 4-6 months or more. More natural evaporation time, during which plants can survive without watering. Observe the indicator rod. If the water in the water storage container is about to evaporate, manually inject water into the water storage container in time to survive the plant. Another advantage of the present invention is that the amount of water that is manually injected into the water storage container is much less than that of irrigation, and therefore the consumption of water resources and labor costs is very low.

As an optimization aspect, according to the above device for ensuring plant survival, the water storage container 1 has a water pipe connection port, and the plurality of water storage containers are connected together by a water pipe. A plurality of water storage containers and evaporation nets are buried in the soil of a large plant root, wherein rain water can flow in the device, and when the rainwater flowing into the water storage container of the device is higher than the water pipe connection port, the water flows into other water storage containers. This will accumulate more rain and promote plant growth. The water pipe connection can also connect tap water or irrigation pipes underground to achieve artificial irrigation.

As an optimization, according to the above device for ensuring plant survival, the water storage container and the evaporation net are integrated, and are called a water storage evaporator, and the upper end of the water storage evaporator has a plurality of the venting hole and the lower end of the water storage evaporator are used for storing water, and have the same function as the water storage container and the evaporation net. The upper end of the water storage evaporator has a cover, and the cover has a conduit hole. The venting hole at the upper end of the water storage evaporation tank can be covered with gauze.

The disclosed device has the advantages of low use cost, simple use and convenient transportation, and is particularly suitable for use in areas with drought and temporary water shortage. After the device is installed, the plant can survive through continuous drought. For people going for a long vacation, with the disclosed device, the flowers and plants raised at home will not die. Some areas grown with only grass can be planted with produce trees such as fruit trees, poplars and pine trees that cannot be planted in otherwise arid areas. Some drought, desertification and desert areas can grow grass and plant trees using the disclosed device to restore the land to an oasis and improve the living environment of human beings.

DETAILED DESCRIPTION

Numeral Legends

1. Container for storing water. 2. Bucket in the shape of a breathable net. 3. Funnel. 4. Indicator rod. 5. Float. 6. Gauze. 7. Plants. 8. Flower pot. 9. Soil. 21. Funnel connection joint. 201. Bucket shaped by a larger breathable net. 202. Duct through hole. 301. Funnel with internal screws. 302. Conduit. 303. Filter screen. 304. Elbow. 305. Check valve. 306. Tapered threaded port. 307. Conical external thread. 3031. Filter holes. 3032. The indicator rod passes through the hole. 701. Large plants. 308. Plastic sheeting. 101. Water pipe connecting head. 102. Water pipes. 103. Lock hook. 3051. Gravity type reverse stop valve. 3052. Hinge shaft. 3053. Hinge seat.

104. Lower large, upper and small water storage containers. 105. Spherical storage vessel. 106. Water storage evaporator. 107. Vent hole. 108. Cover. 501. Spherical float.

SPECIFIC MODES OF IMPLEMENTATION

Embodiment 1

Figure 1:
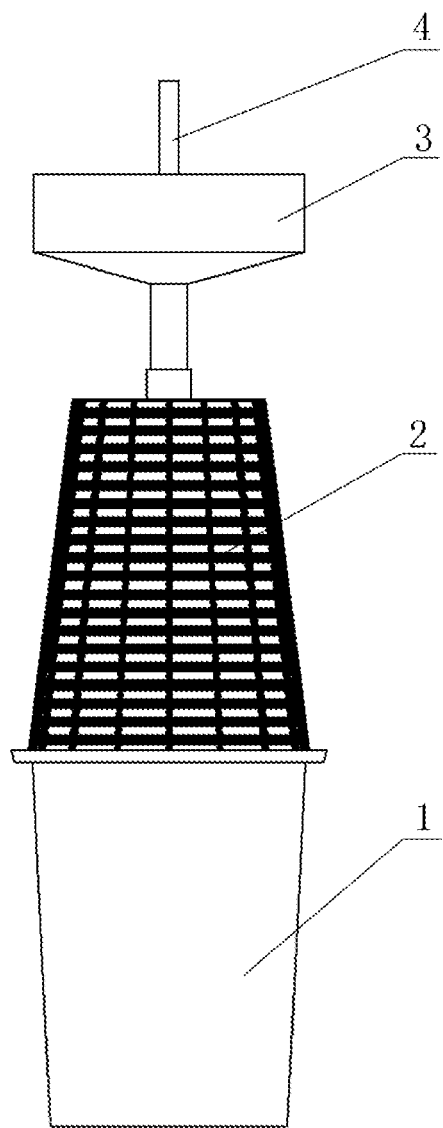
FIG. 1 is structural diagram of embodiment 1 of the present disclosed device to protect plant survival.
Figure 2:
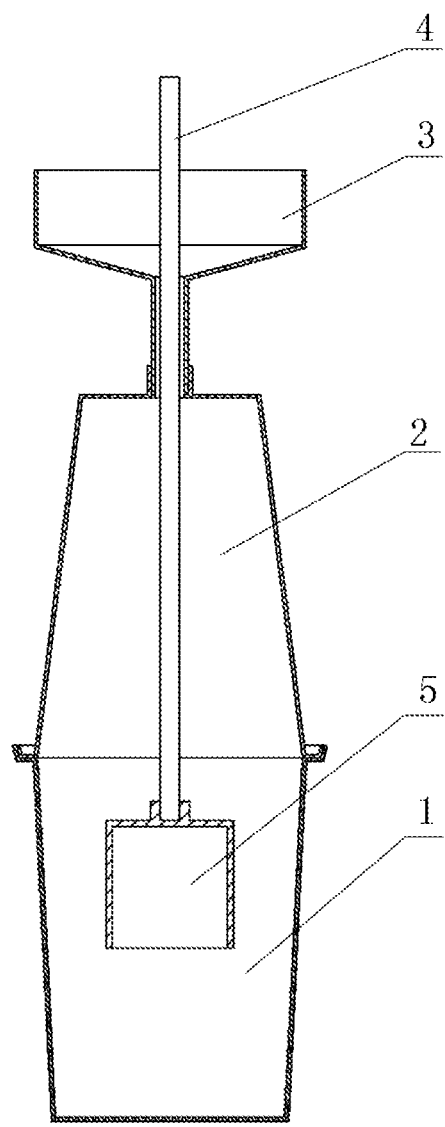
FIG. 2 is a cross-sectional side view of the embodiment 1 of the present disclosed device of FIG. 1.

FIG. 1 is a structural diagram of embodiment 1 of a device to protect plant survival of the present disclosed device. FIG. 2 is a sketch map of FIG. 1. The device for protecting plant survival. Include Container for storing water 1. Bucket in the shape of a breathable net 2. Funnel 3. Indicator rod 4. Float 5. Container for storing water 1 for water storage. Water storage container 1 with evaporation net 2. Evaporation net 2 is a breathable structure. The evaporation net 2 is connected with a funnel 3. The drain pipe of funnel 3 is fitted with a lever 4. There is a gap between the leakage tube of funnel 3 and the indicator rod 4. The lower end of the indicator rod 4 extends to the storage container 1 and is connected with a float 5. Float 5 drives indicator bar 4 to indicate water level in storage container 1.

Embodiment 2

Figure 3:
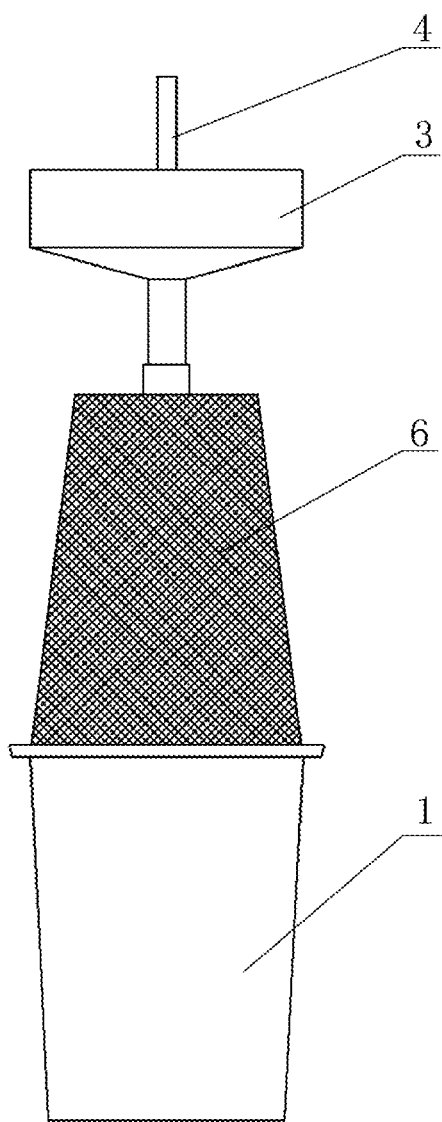
FIG. 3 is a structural diagram of embodiment 2 of the present disclosed device.

FIG. 3 is a structural diagram of embodiment 2 of the present disclosed device. According to the device for safeguarding plant survival described in embodiment 1, the evaporation net 2 outer cover has a yarn mesh (gauze 6). Prevent soil or sand from entering the storage container 1.

Figure 4:
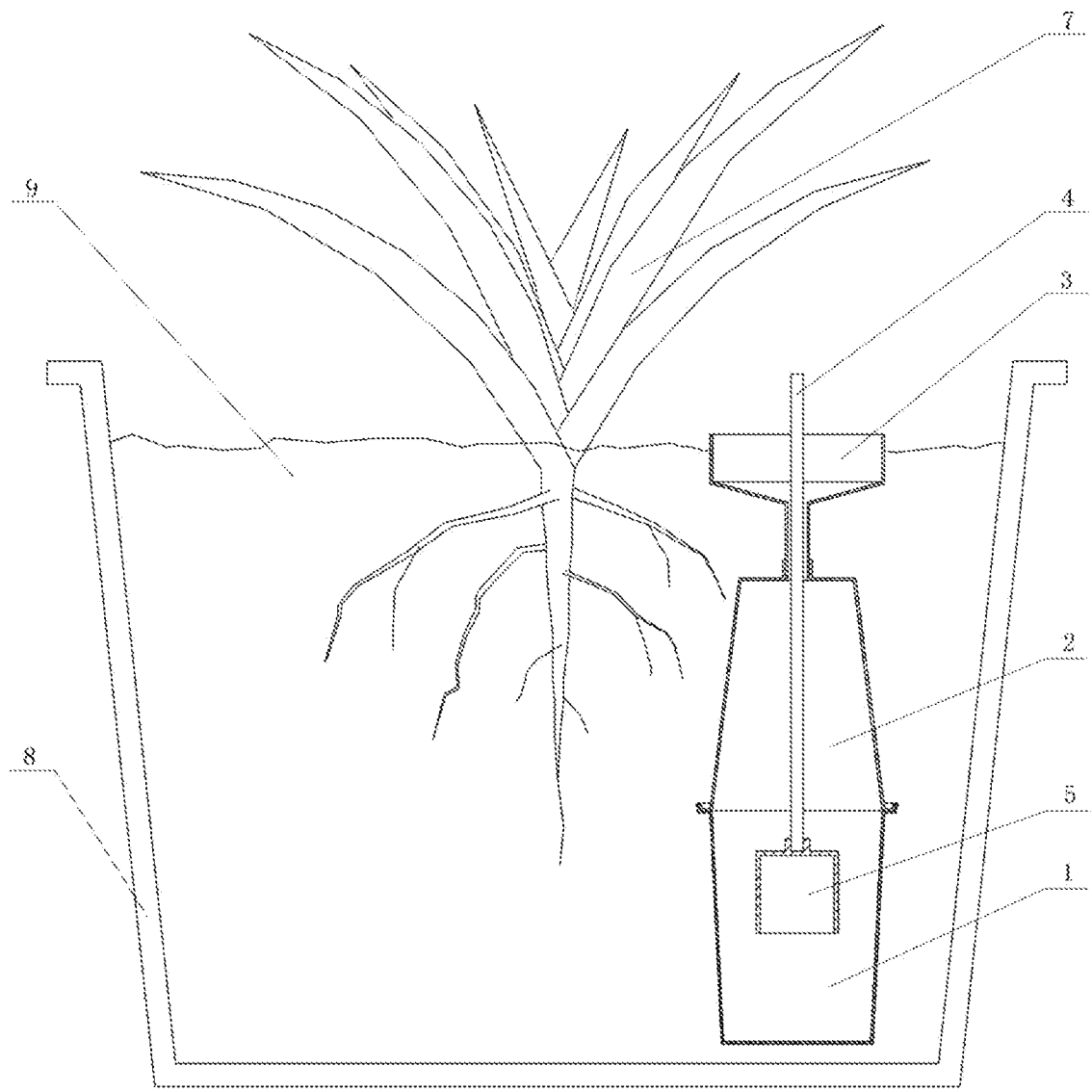
FIG. 4 is a schematic diagram of the device of the present disclosed device for protecting plant survival in flower pots.

FIG. 4 is a schematic diagram of the device of the present disclosed device for protecting plant survival in flowerpots. The methods used are: Burying the water storage container 1 and the evaporation net 2 in the soil of the 7 roots of the plant in the flowerpot 8. Injecting water into the water storage container 1 through the gap between the leakage pipe of funnel 3 and the indicator rod 4. Float 5 is floated to the surface by water. Float 5 drives indicator rod 4 up the water level in indicating storage container 1. The indicator bar 4 may be marked with a scale. To indicate the level of the internal water level of the water storage container 1. Water until the container is full. After that, the water in the water storage container 1 evaporates naturally into the soil through the evaporation net 2. To keep the water in the soil and keep the plants alive, water storage container 1 can be filled with water for 1 to 5 months or more of natural evaporation time. The specific retention time is determined by the size of the water storage container 1, the temperature, and the amount of water absorbed by the plant. If winter lasts longer, plants can survive without watering. If the roots of plants are deeper. The funnel and the evaporator are connected by a conduit.

Figure 5:
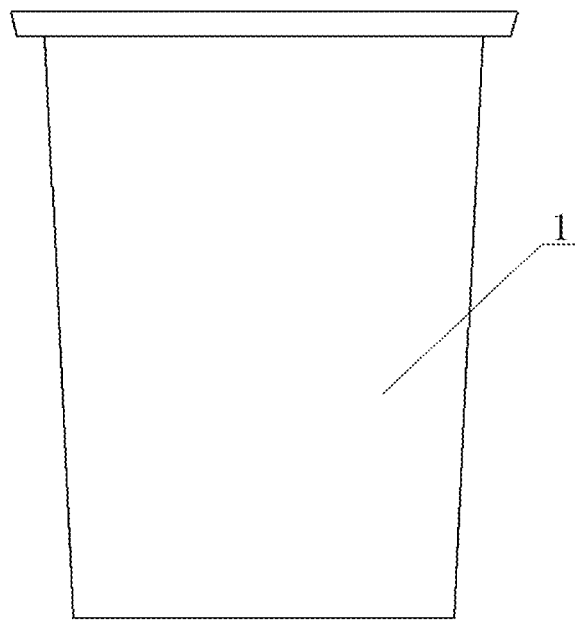
FIG. 5 is a structural diagram of the water storage container 1 of the disclosed device.
Figure 6:
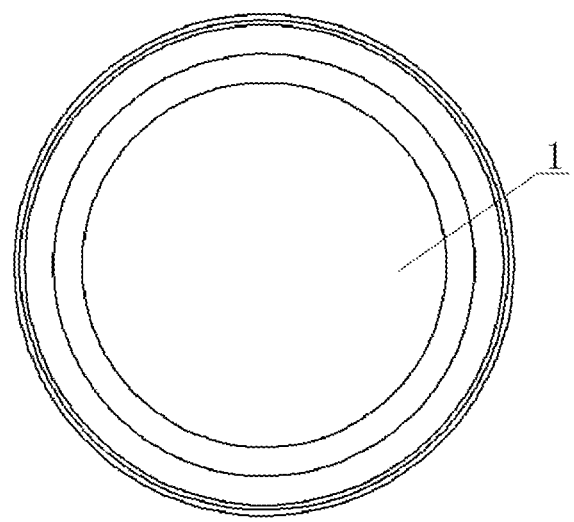
FIG. 6 is a top view of the water storage container 1 of FIG. 5.
Figure 7:
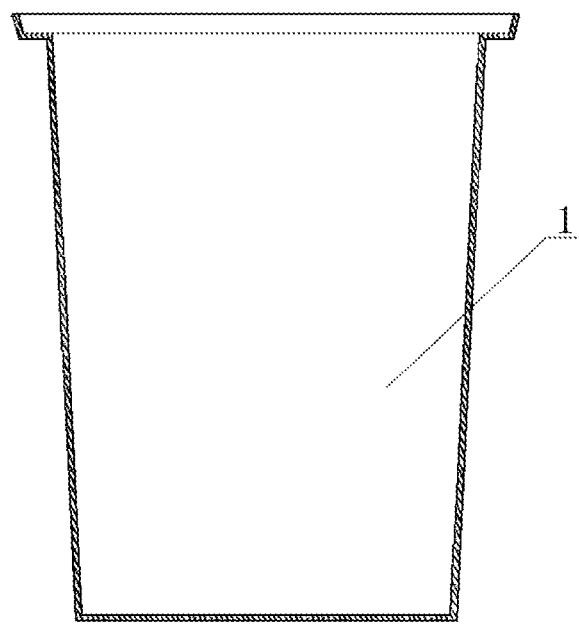
FIG. 7 is a cross-sectional view of the water storage container 1 of FIG. 5.

FIG. 5 is a structural diagram of the water storage container 1 of the device. FIG. 6 is a top view of FIG. 5. FIG. 7 is a cross-sectional view of FIG. 5. Container for storing water 1 can be made of plastic, rubber, ceramics, glass, stainless steel, metal, etc.

Figure 8:
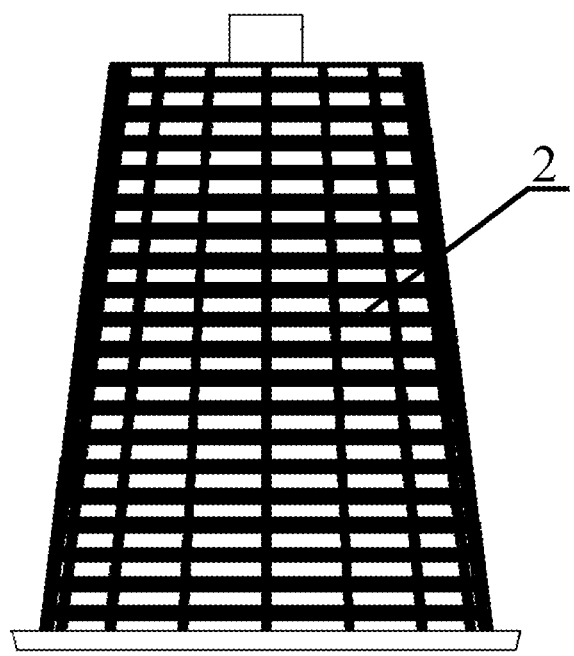
FIG. 8 is a structural diagram of embodiment 1 evaporation net 2.
Figure 9:
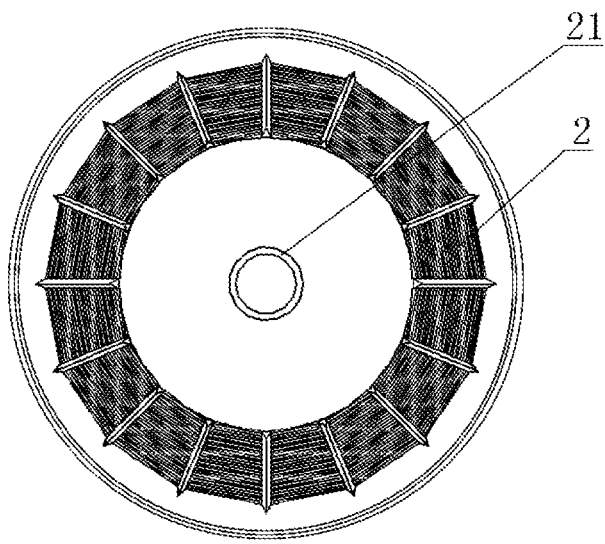
FIG. 9 is a top view of FIG. 8.
Figure 10:
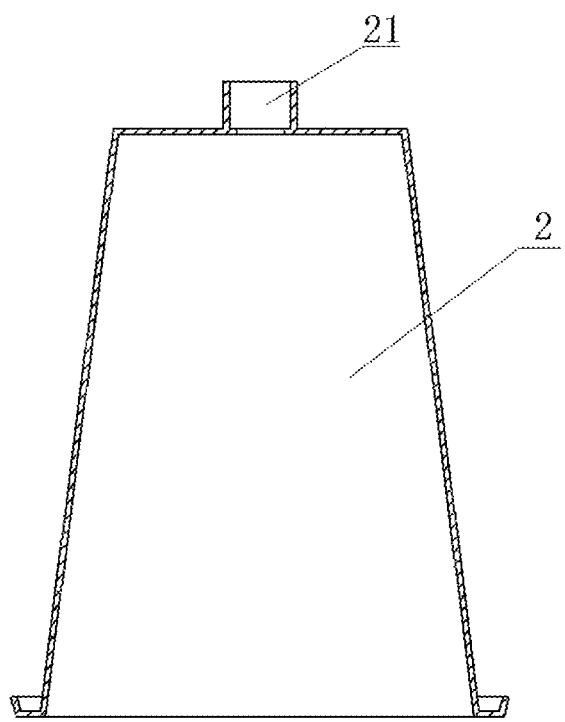
FIG. 10 is a cross-sectional front view of FIG. 8.

FIG. 8 is a structural diagram of embodiment 1 evaporation net 2. FIG. 9 is a top view of FIG. 8. FIG. 10 is a cross-sectional view of FIG. 8. Bucket in the shape of a breathable net 2 is a breathable basket-type structure. Water vapor can pass through. There is a funnel connection joint 21 on the bucket in the shape of a breathable net 2. The bucket in the shape of a breathable net 2 can be made of plastic, rubber, ceramics, glass, stainless steel, metal, etc. It can also be woven for bamboo, rattan, straw, straw, etc.

Figure 11:
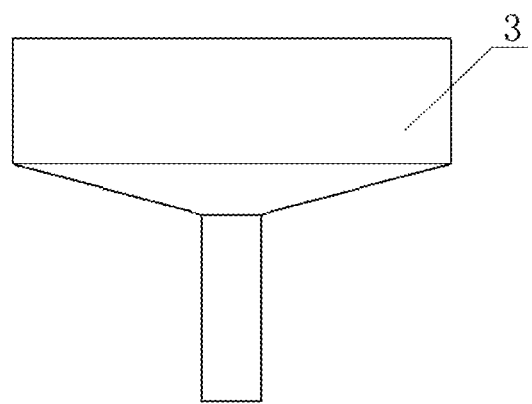
FIG. 11 is a structural diagram of a funnel 3 of embodiment 1.
Figure 12:
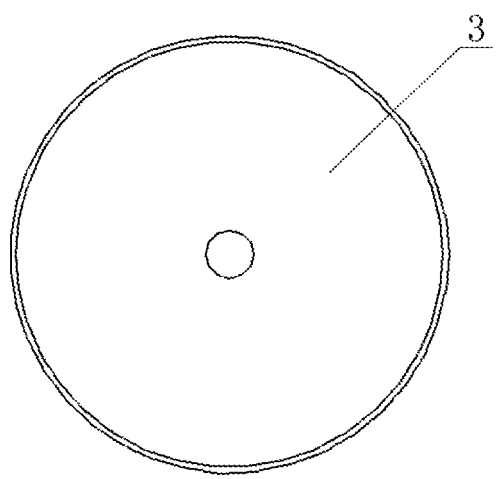
FIG. 12 is a top view of the funnel 3 of embodiment 1 in FIG. 11.
Figure 13:
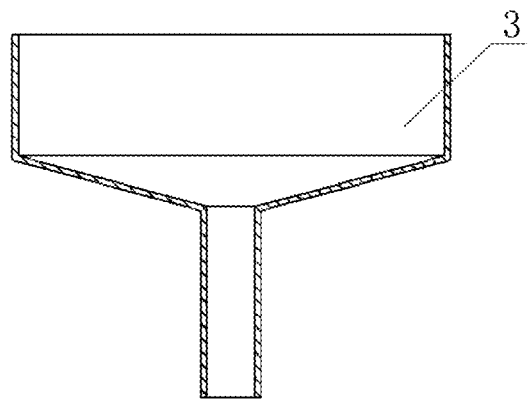
FIG. 13 is a cross-sectional side view of the funnel 3 of embodiment 1 in FIG. 11.

FIG. 11 is a structural diagram of embodiment 1 funnel 3. FIG. 12 is a top view of FIG. 11. FIG. 13 is a cross-sectional view of FIG. 11. Funnel 3 can be made of plastic, rubber, ceramics, glass, stainless steel, metal, etc.

Figure 14:
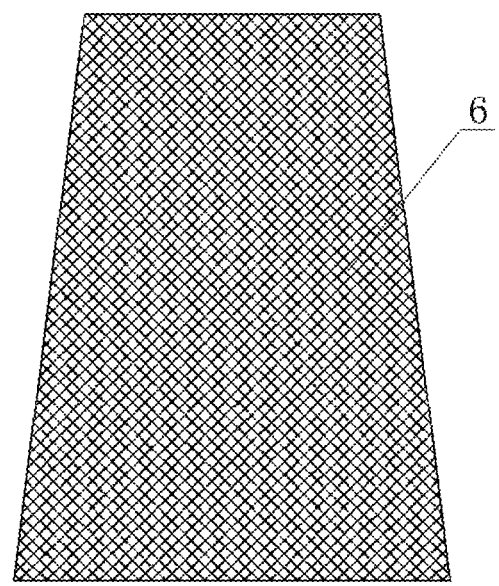
FIG. 14 is a schematic diagram of the structure of a gauze 6 of embodiment 2.
Figure 15:
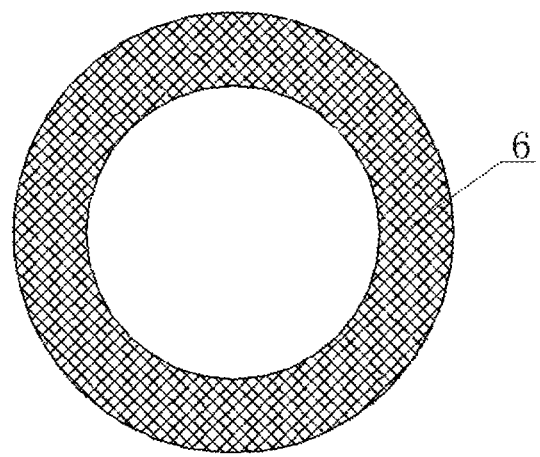
FIG. 15 is a top view of the gauze 6 in FIG. 14.

FIG. 14 is a schematic diagram of the structure of embodiment 2 gauze 6. FIG. 15 is a top view of FIG. 14. Gauze 6 may be metal or nylon, plastic sand mesh. It can also be cloth, brown, bamboo, rattan, straw, straw, etc. Gauze 6 made of flat mesh or cloth has joint seams.

Figure 16:
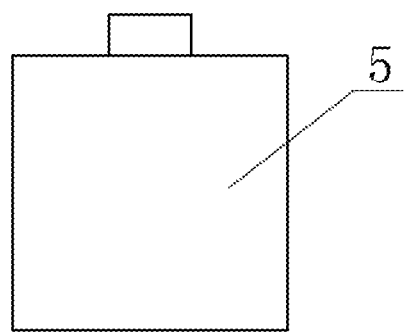
FIG. 16 is a structural diagram of a float 5.
Figure 17:
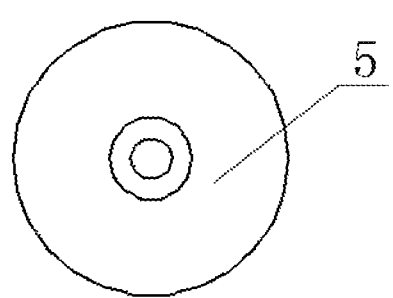
FIG. 17 is a top view of the float 5 in FIG. 16.
Figure 18:
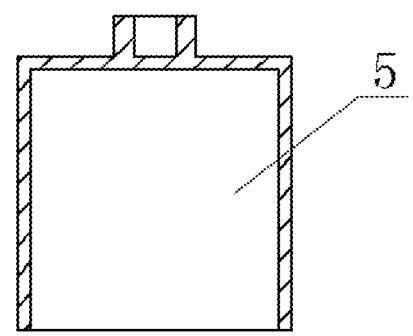
FIG. 18 is a cross-sectional front view of the float 5 in FIG. 16.

FIG. 16 is a structural diagram of float 5. FIG. 17 is a top view of FIG. 16. FIG. 18 is a cross-sectional view of FIG. 16. The float 5 is in the barrel shape of the lower opening. The upper end of float 5 is connected with an indicator rod. Float 5 can be plastic, rubber, ceramic, glass, stainless steel, metal and so on. Indicator rod 4 can be plastic, ceramic, glass, stainless steel, aluminum alloy, bamboo, wood, etc.

Embodiment 3

Figure 19:
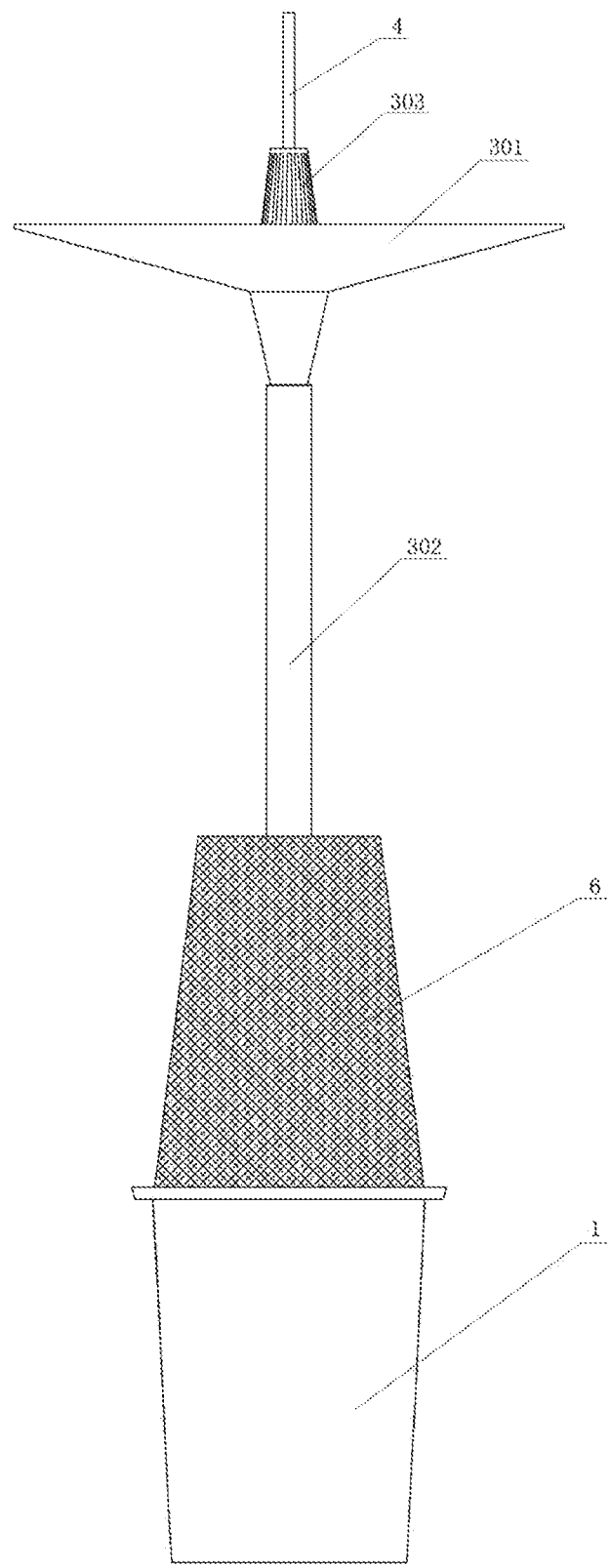
FIG. 19 is a structural diagram of the present disclosed device in embodiment 3.
Figure 20:
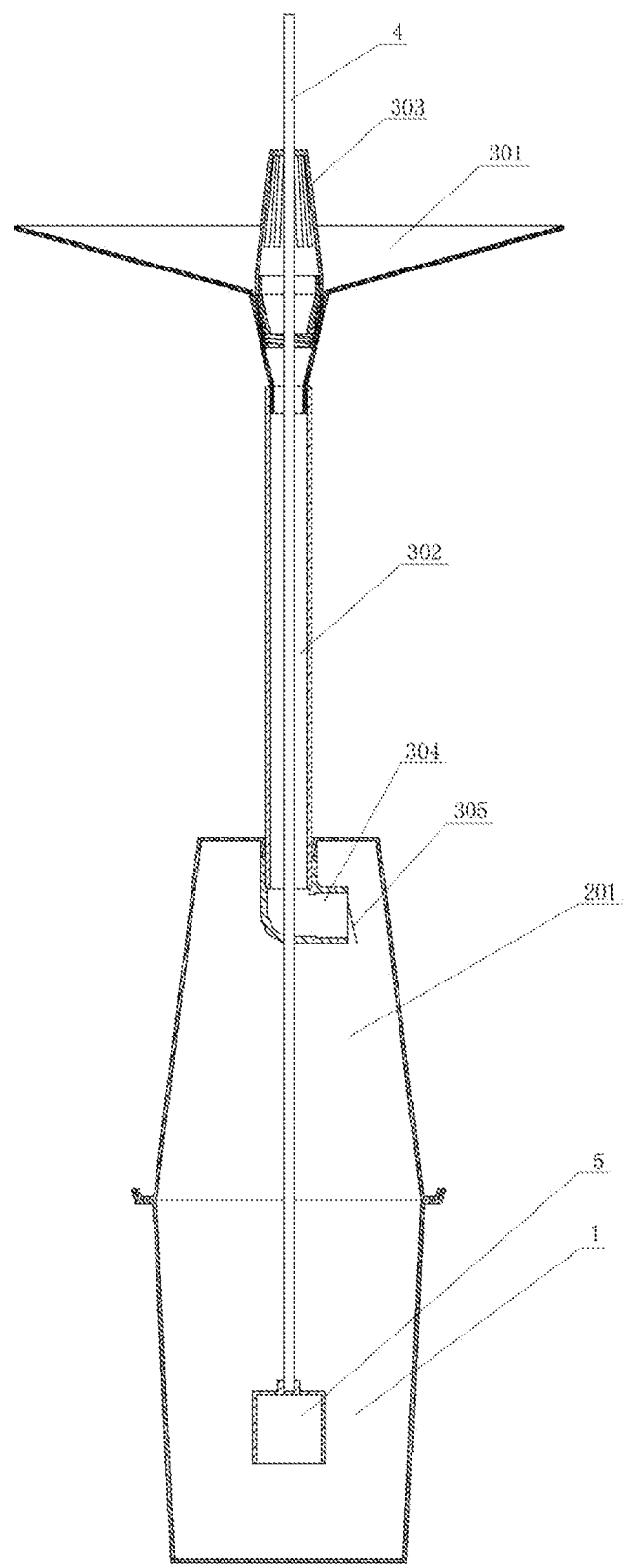
FIG. 20 is a cross-sectional view of the device in embodiment 3 in FIG. 19.

FIG. 19 is a structural diagram of embodiment 3 of the present disclosed device; FIG. 20 is a cross-sectional view of FIG. 19. The device for protecting plant survival can be used for larger plants, such as trees. The difference from the funnel 3 described in embodiment 1 is that a filter is installed in the funnel. The function of the filter is to prevent floating objects such as leaves, weeds, branches, and small animals from entering the device, The funnel and the filter can be connected in a variety of ways. For example, with the bayonet, screw mouth and other ways to connect.

Figure 21:
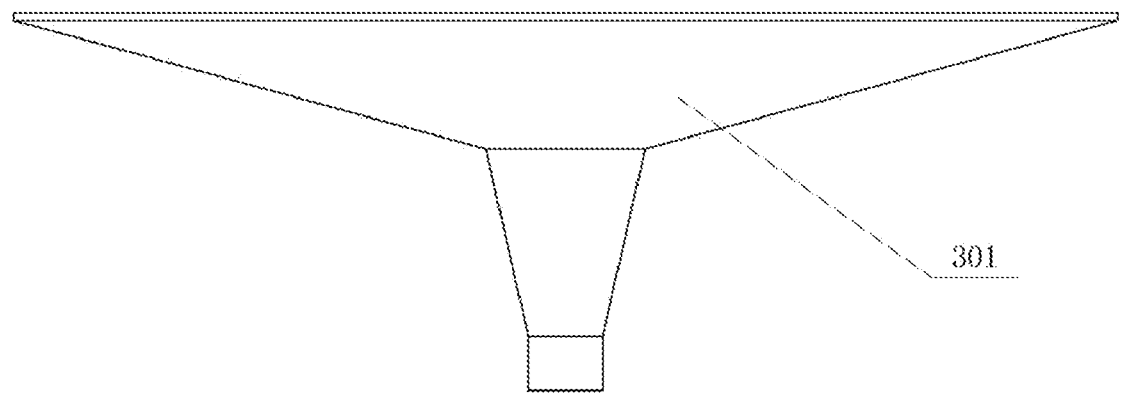
FIG. 21 is a front view structural diagram of the funnel 301 having internal screws.
Figure 22:
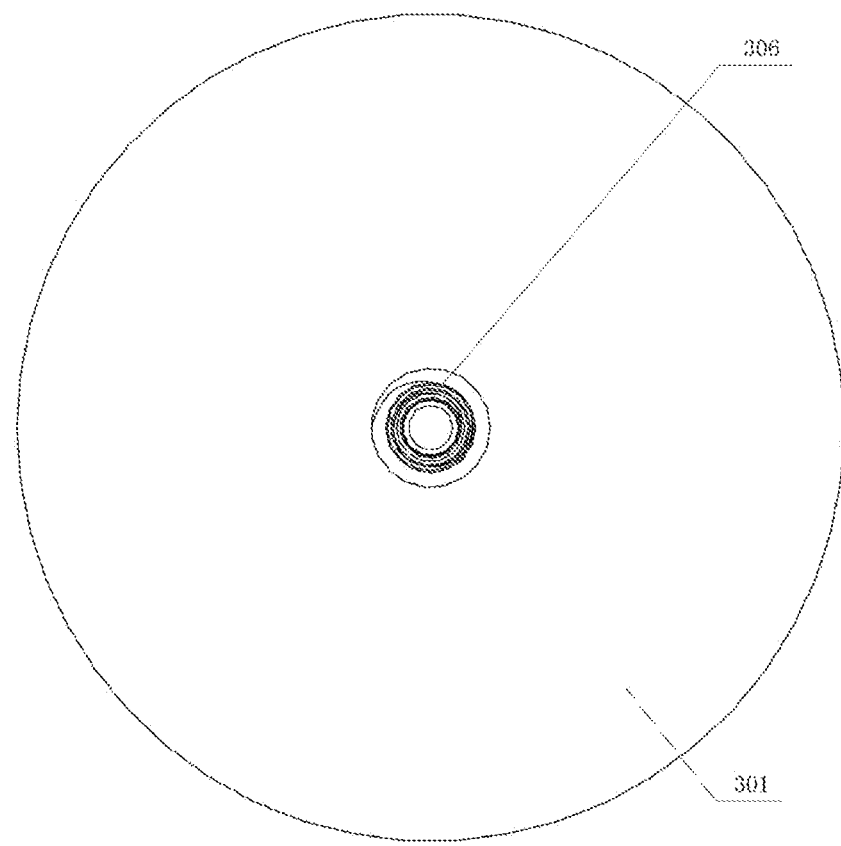
FIG. 22 is a top view of the funnel 301 having internal screws in FIG. 21.
Figure 23:
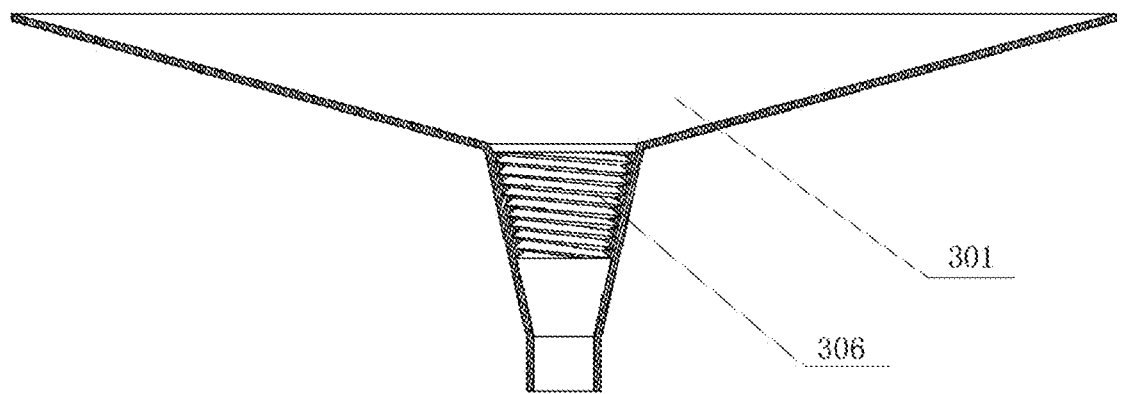
FIG. 23 is a cross-sectional side view of the funnel 301 having internal screws in FIG. 21.
Figure 24:
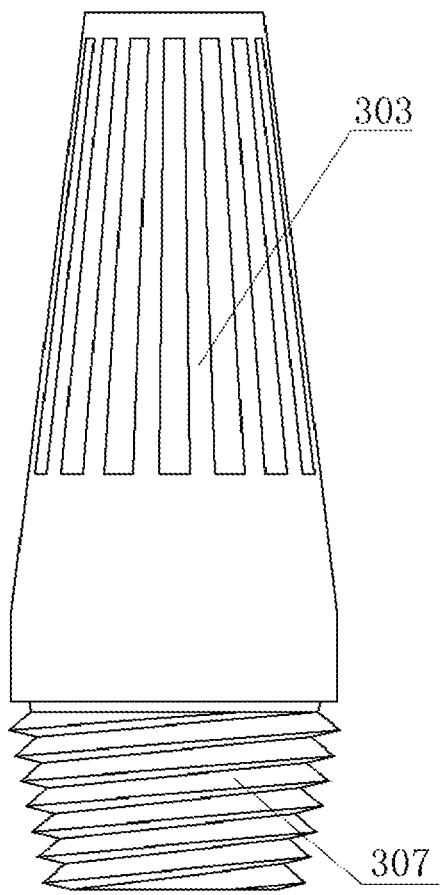
FIG. 24 is a structural diagram of a filter net 303 of embodiment 3.
Figure 25:
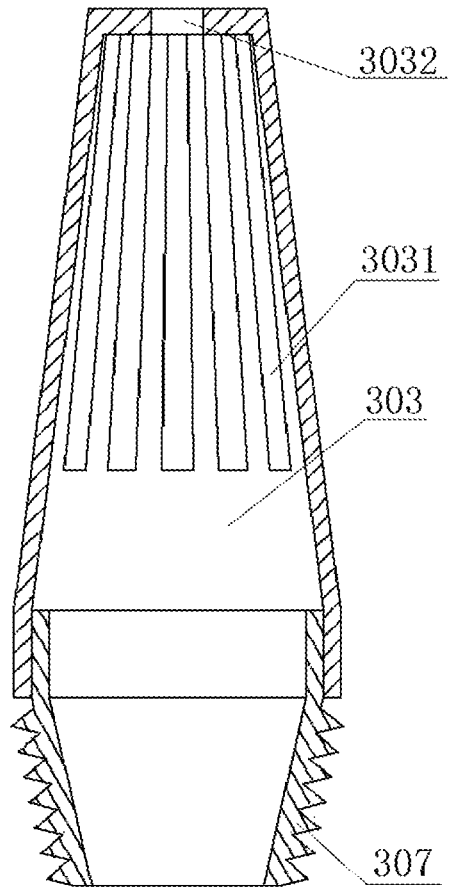
FIG. 25 is a cross-sectional front view of the filter net 303 in FIG. 24.

The present embodiment provides an example of a method of connecting with a tapered thread, FIG. 21 is a schematic diagram of the funnel with internal screws 301. FIG. 22 is a top view of FIG. 21. FIG. 23 is a cross-sectional view of FIG. 21. FIG. 24 is a structural diagram of embodiment 3 filter net 303. FIG. 25 is a cross-sectional view of FIG. 24; The lower end of the filter net 303 has a tapered outer thread opening (conical external thread 307). The filter net 303 is fitted in a funnel 301 with a tapered threaded opening. The upper end of the filter net 303 is provided with a filter hole 3031 and an indicator rod passing through the hole 3032. The filter hole 3031 can be other shapes, such as meshes, rounded holes. Filters can also be replaced by floor drains. But the floor drain is easily clogged by leaves. A funnel 301 with a tapered threaded opening is connected to the evaporation net through the conduit 302. The lower end of the conduit 302 is connected with a elbow 304.

Figure 26:
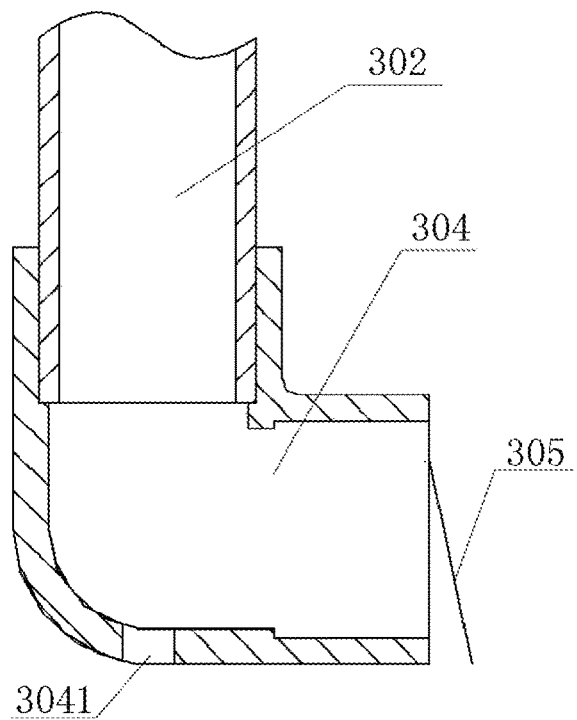
FIG. 26 is a cross-sectional front view of the elbow 304 of embodiment 3.
Figure 27:
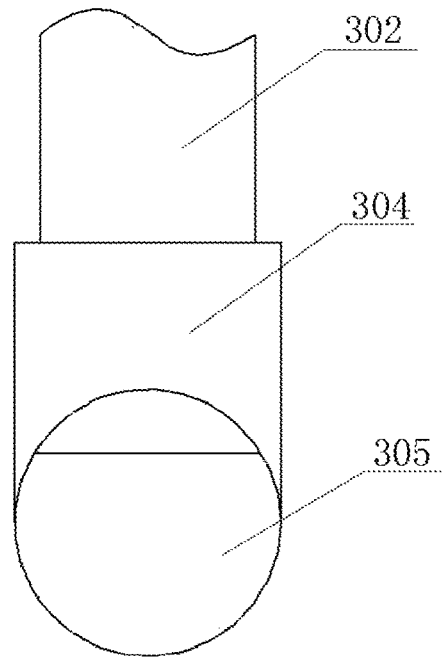
FIG. 27 is a side view of the elbow 304 of embodiment 3 in FIG. 26.

FIG. 26 is a schematic diagram of the sectional structure of embodiment 3 elbow 304. FIG. 27 is a right view of FIG. 26; the other end water outlet of the elbow 304 is provided with a check valve 305. After the water injection is stopped, the outlet will be blocked, preventing the water vapor in the water storage container 1 from evaporating into the atmosphere along the conduit 302. The elbow 304 is provided with a hole 3041 indicating the passage of the rod 3041. Indicator rod 4 is connected to the float 5.

Figure 28:
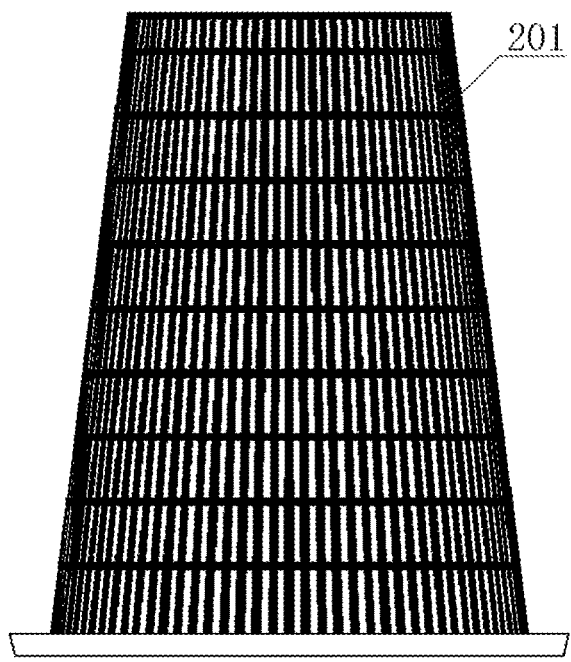
FIG. 28 is a schematic diagram of the structure of a large evaporative net 201 in embodiment 3.
Figure 29:
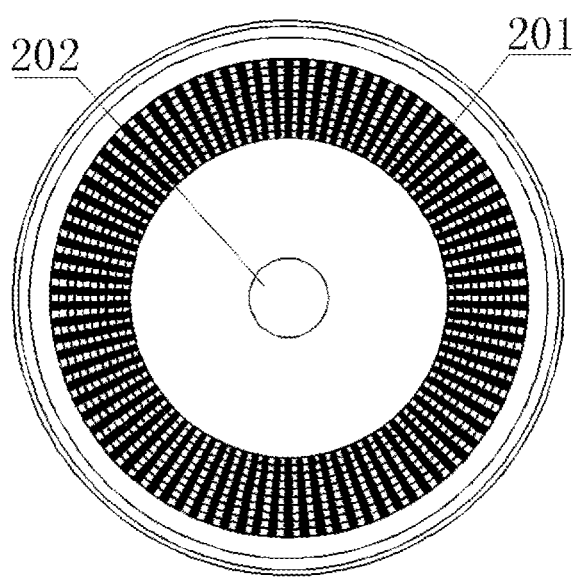
FIG. 29 is a top view of the large evaporative net 201 in FIG. 28.
Figure 30:
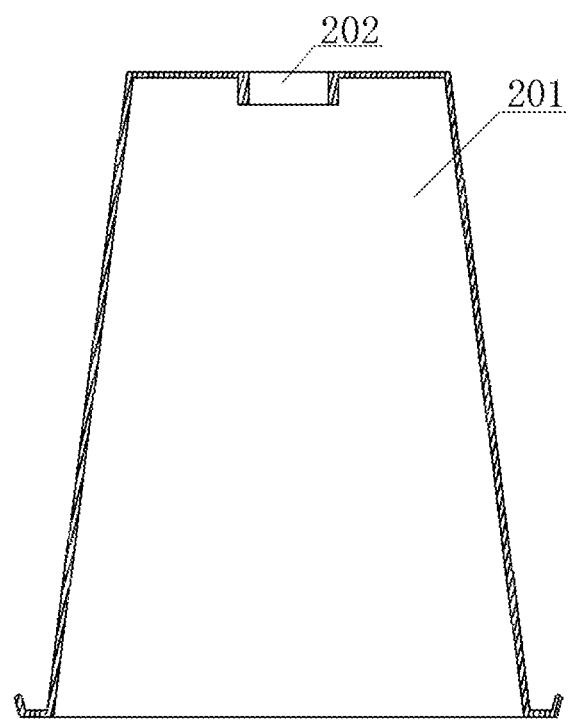
FIG. 30 is a cross-sectional side view of the large evaporative net 201 in FIG. 28.

FIG. 28 is a schematic diagram of the structure of a large evaporative net 201 in embodiment 3. FIG. 29 is a top view of FIG. 28. FIG. 30 is a cross-sectional view of FIG. 28. Duct through hole 202 on the large evaporative net.

Figure 31:
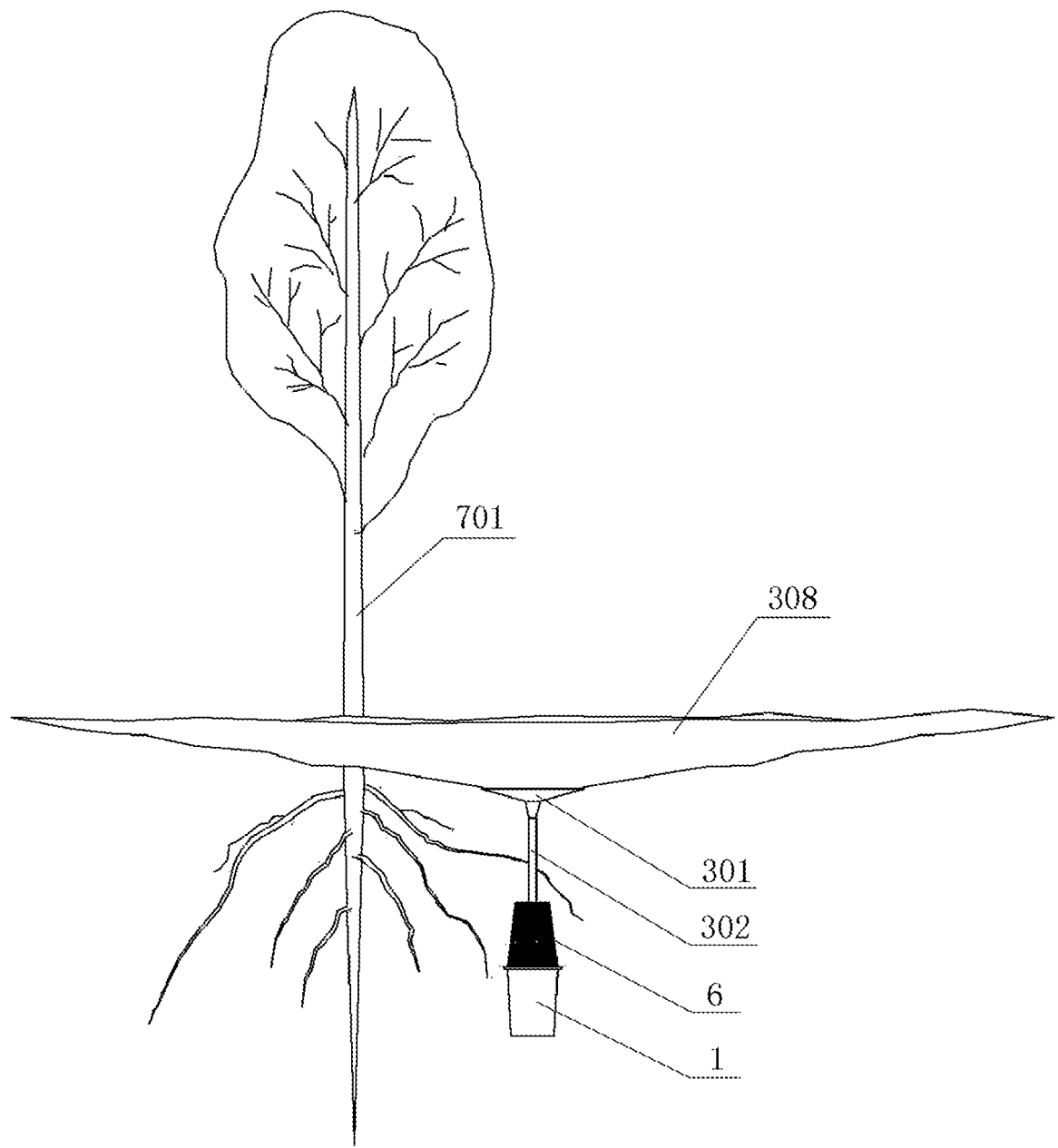
FIG. 31 is a schematic diagram of the device described in embodiment 3 for a large plant 701.
Figure 32:
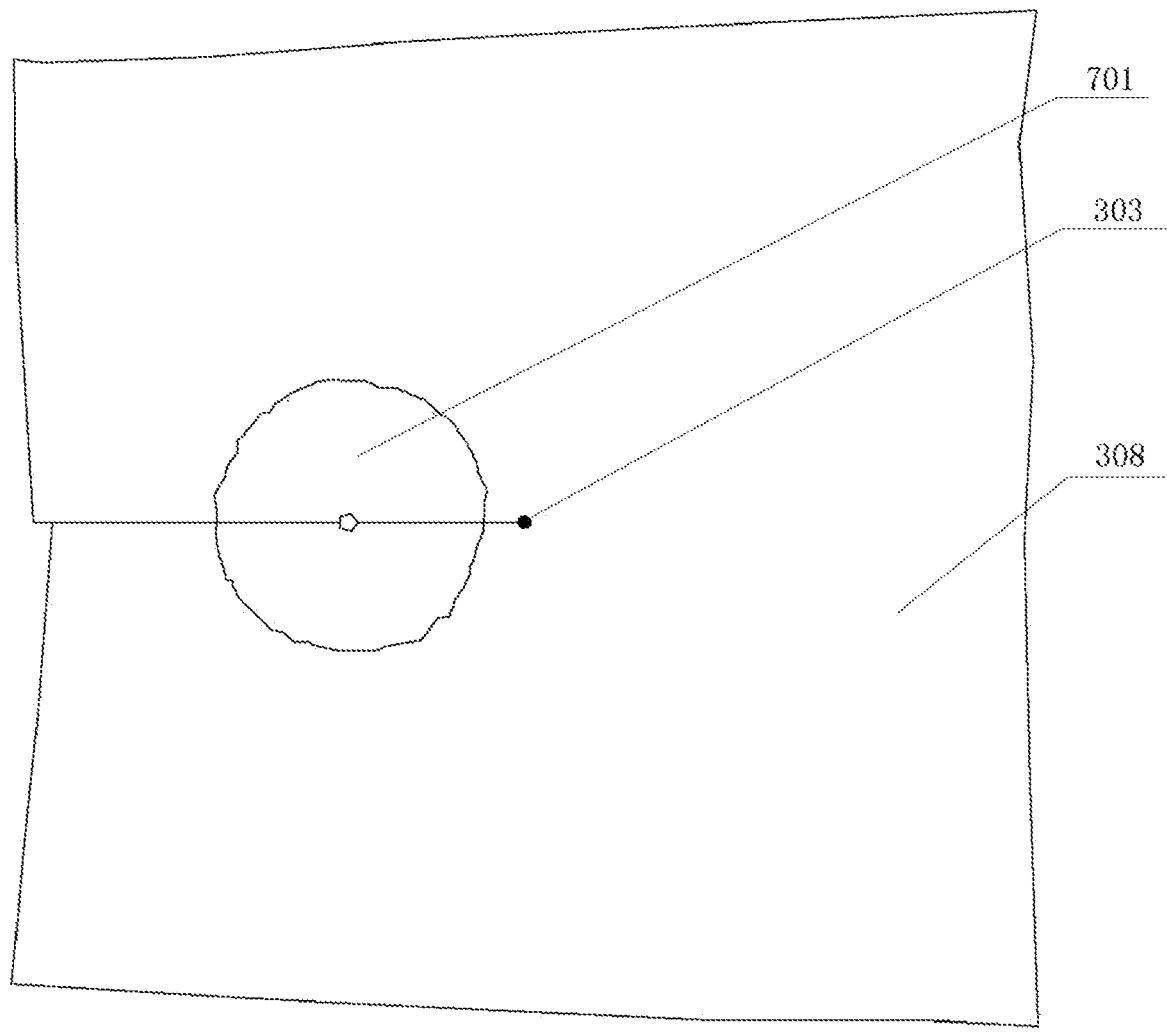
FIG. 32 is a top view of FIG. 31.
Figure 33:
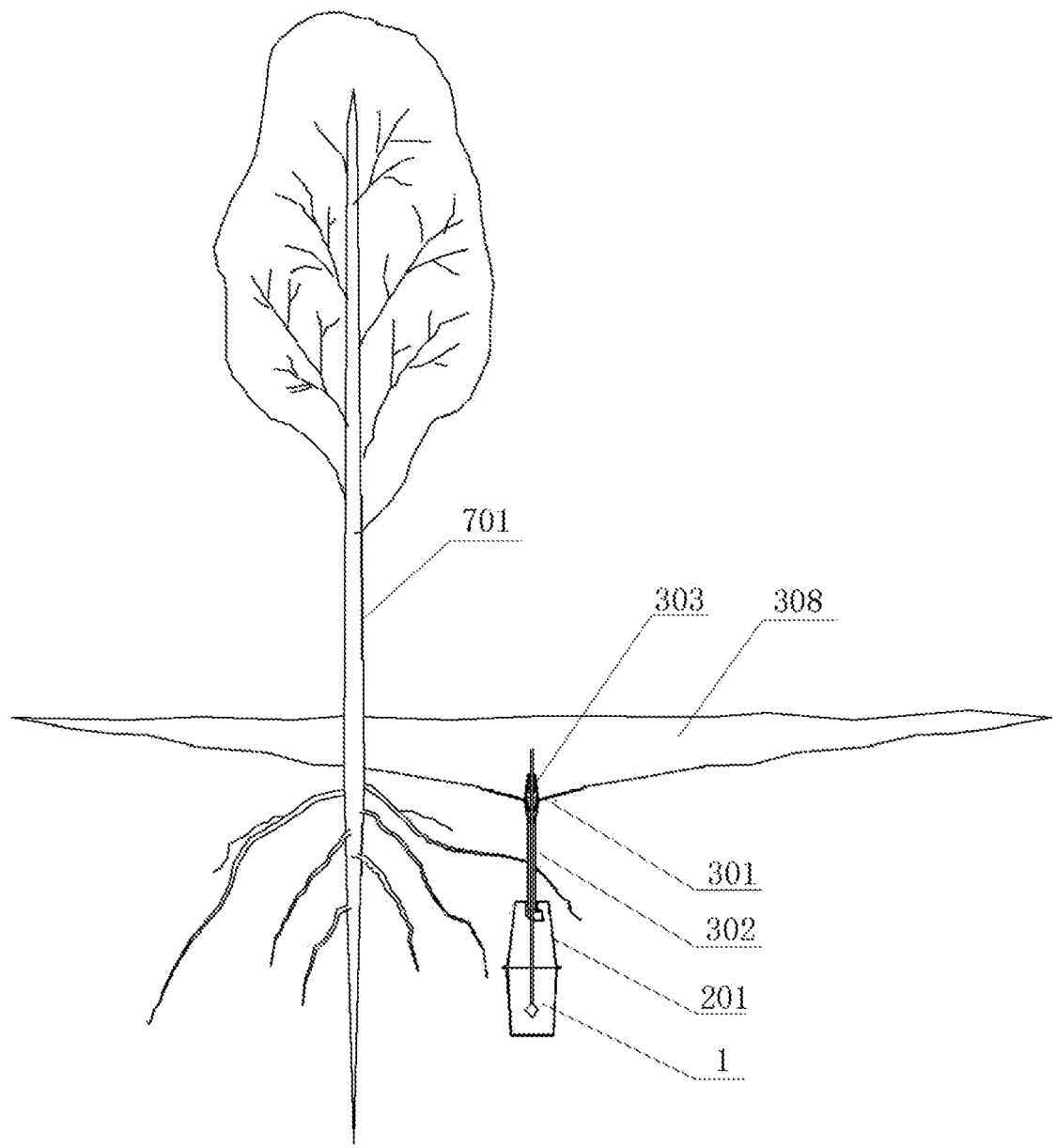
FIG. 33 is a cross-sectional front view of FIG. 31.

FIG. 31 is a schematic diagram of the device described in embodiment 3 for large plant 701. FIG. 32 is a top view of FIG. 31. FIG. 33 is a cross-sectional view of FIG. 31. The methods used are: The water storage container 1 and the larger evaporation net 201 are buried in the soil of the root of the large plant 701. Adjust the length of the conduit 302 according to the depth of the plant root. Funnel 301 is placed slightly below the ground level, so that the ground rain water can flow into the storage container 1;

Plastic sheeting can be inserted between the tapered threaded port 306 of the funnel and the conical external thread 307 of the filter net 303. The advantage of conical thread over ordinary thread is that it can be clamped into plastic sheeting of different thickness. On the basis of soil, the plastic sheeting 308 was laid into a funnel shape with a certain slope. The surrounding edges are compacted with soil or sand or stone. To prevent the wind from blowing away the plastic sheeting, rain water gathered through the surface of the plastic sheeting 308 to the filter net 303, rain water passes through the filter hole 3031, the funnel, the conduit 302 flows into the water storage container 1.

Indicator rod 4 indicates the water level of the storage container 1. If the rainfall is too high, the water above the storage container 1 penetrates into the soil. The water in the water storage container 1 after rain evaporates naturally into soil 9 through the evaporation net 2. Keep the water in the soil, keep the plants alive. According to the size of the storage container 1, Water storage container 1 can be filled with water for 4-6 months or more of natural evaporation time. During this time, plants can survive without watering.

Observation lever 4. If the evaporation of the water in the water storage container 1 is nearing its end before rain water arrives next time, artificial water injection is carried out in time to the storage container 1 in time, to keep the plants evergreen. Another advantage of the disclosed device is that the amount of water artificially injected into the water storage container 1 is much less than that of irrigation. So, especially in areas where water resources are scarce, water and labor costs are very low.

Figure 34:
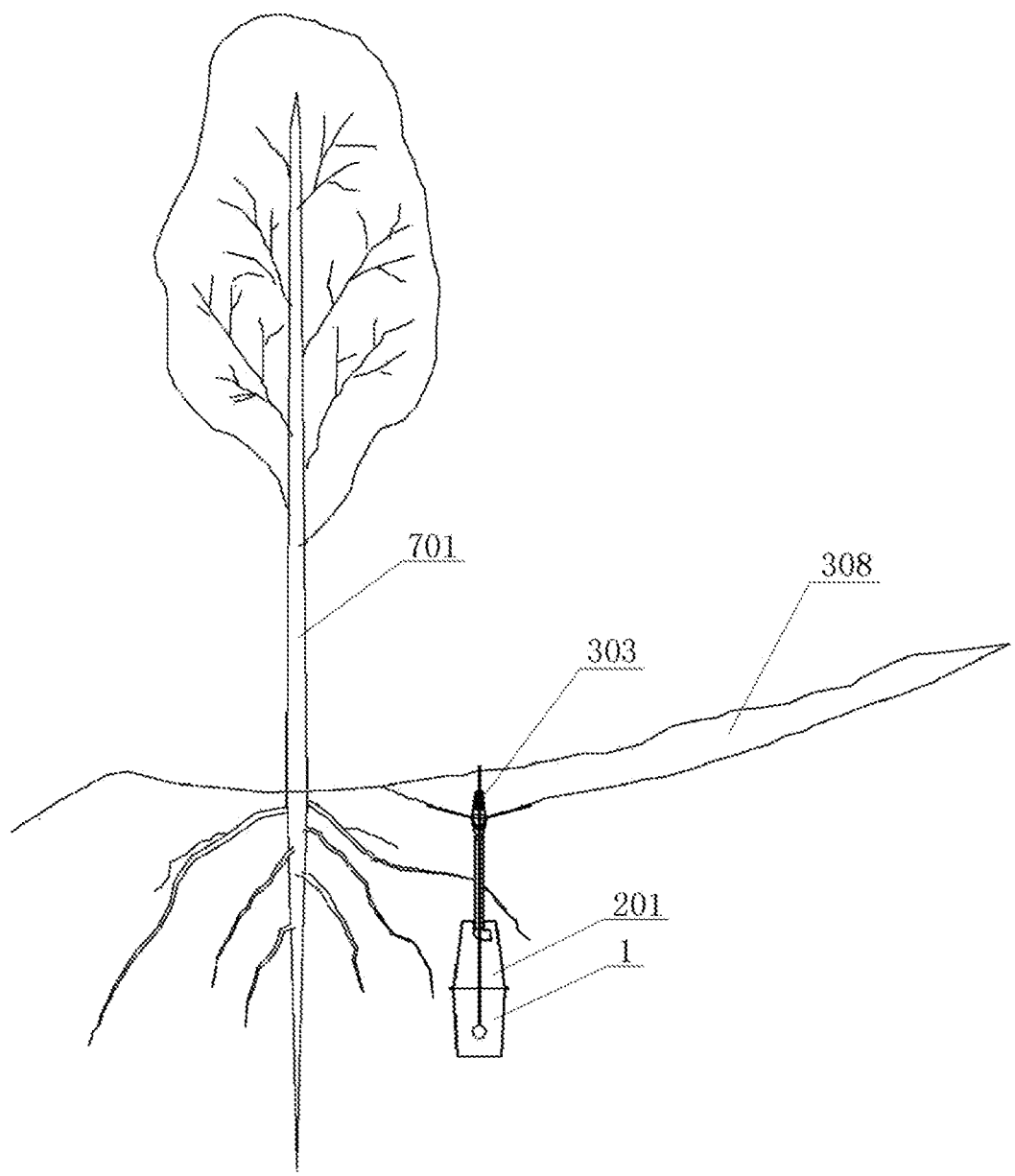
FIG. 34 is a schematic diagram of a large plant 701 of the device installed in a slope as described in embodiment 3.
Figure 35:
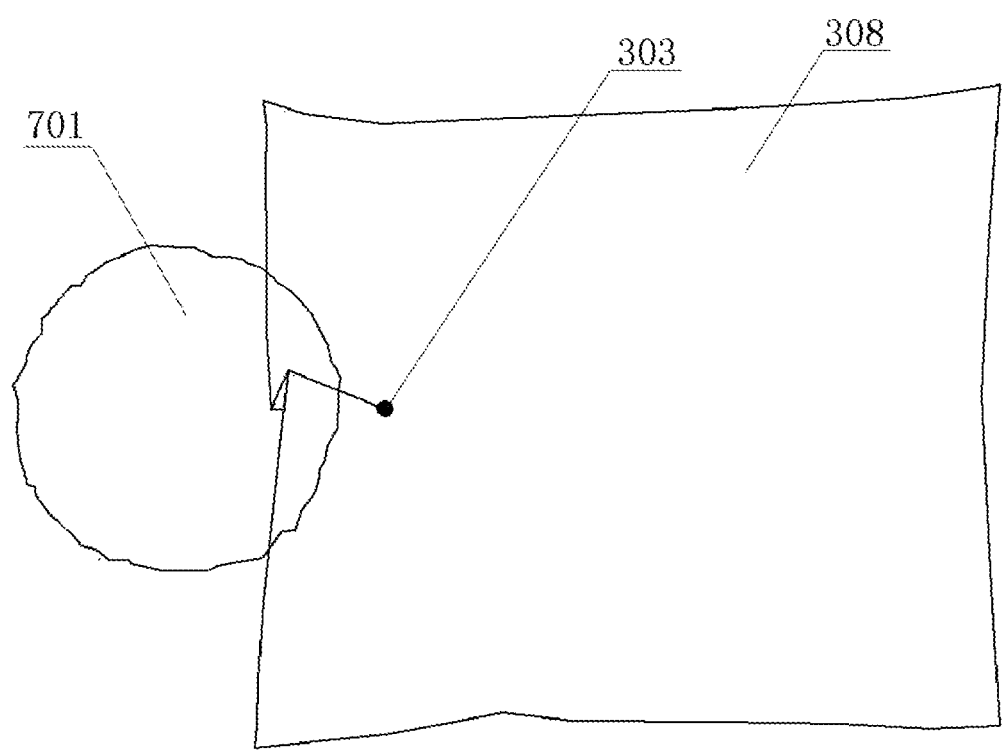
FIG. 35 is a top view of FIG. 34.

FIG. 34 is a schematic diagram of a large plant 701 of the device for sloping land as described in embodiment 3. FIG. 35 is a top view of FIG. 34. In the hillside, the plastic sheeting 308 can be placed high on the hillside, easy to collect rain water. The drain of the alignment funnel opens a hole on the plastic sheeting 308. A plastic sheeting is clamped between the tapered thread port 306 of the funnel and the tapered outer thread (conical external thread 307) of the filter net 303.

The plastic sheeting 308 described in embodiment 3 may also be replaced by other waterproof materials, such as linoleum, artificial leather, waterproof cloth, iron sheet, aluminum foil, etc. It can also be replaced by cement, tile, stone, etc.

Figure 36:
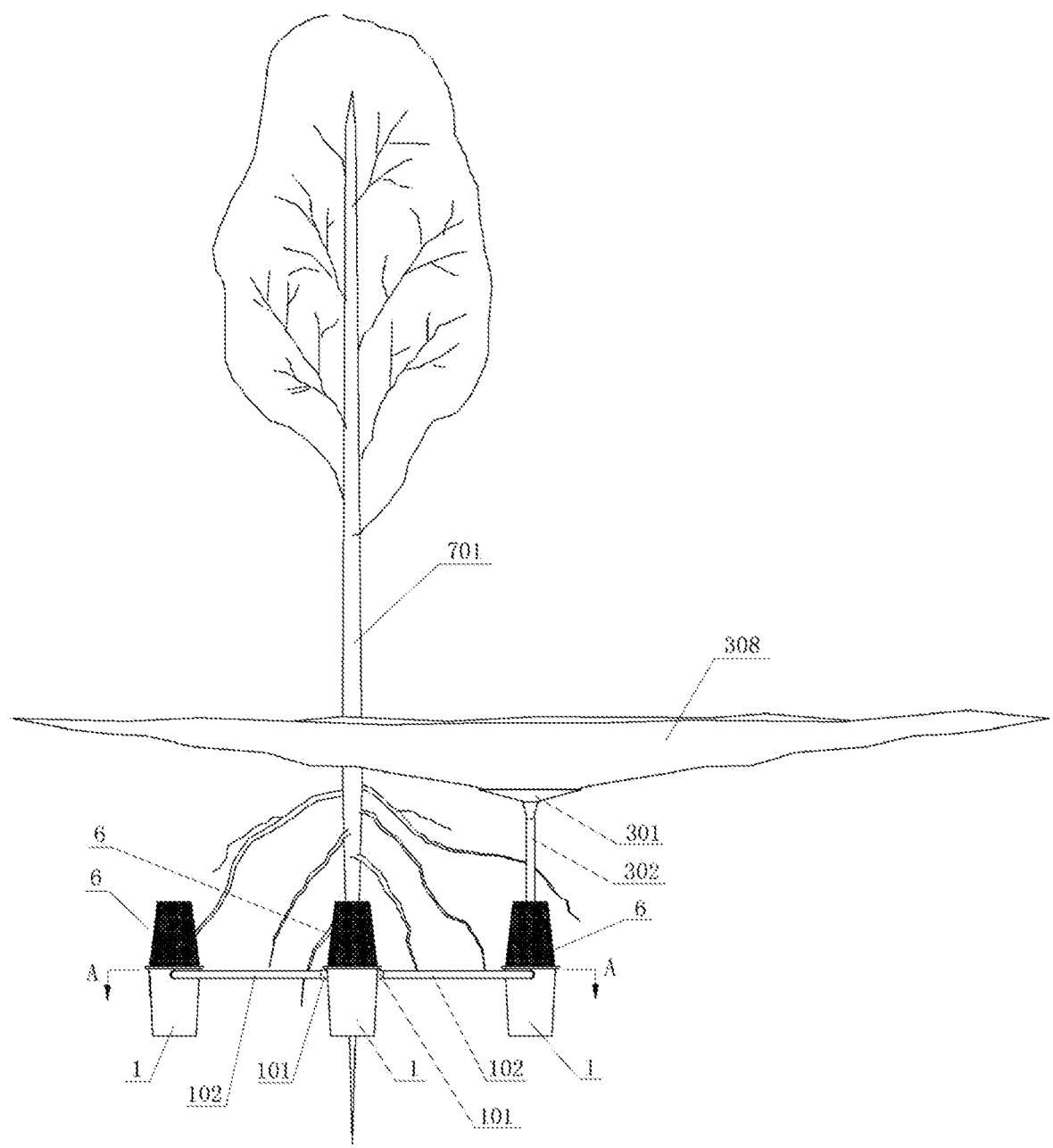
FIG. 36 is a schematic diagram of embodiment 4 of the present disclosed device for a large plant 701.
Figure 37:
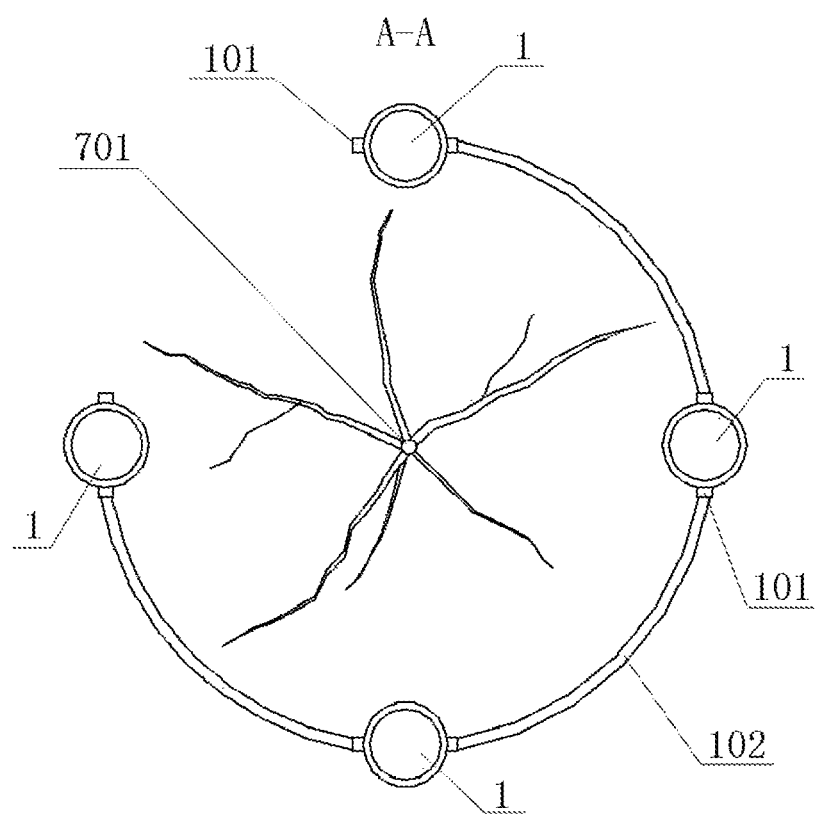
FIG. 37 is a cross-sectional top view of the A-A cross section of FIG. 36.

FIG. 36 is a schematic diagram of embodiment 4 of the present disclosed device for large plant 701. FIG. 37 is a diagram of the A-A profile of FIG. 36. The device for protecting plant survival can be used to preserve large trees. Multiple devices can be placed around the root of a large tree. Another scheme provided by the present disclosed device is: The water storage container 1 is provided with a water pipe connection port 101. A plurality of storage containers 1 are connected together with a water pipe 102. Burying multiple storage containers 1 and evaporation net 2 in the soil at the root of a large plant 701, one of the devices can flow into the rain. When rain water's water surface flowing into the storage vessel of the installation was higher than the connection port 101 of the water pipe, the water will flow into other storage containers. This can assemble more rain water, promote plant growth. Pipe connection 101 can also be connected to the underground tap water or irrigation pipe to achieve artificial irrigation.

The water pipe connection 101 is arranged at any part of the water storage container 1. The upper advantages of the pipe connection 101 provided in the storage container 1 are:

The water level of one of the storage vessels remains high. Water evaporation is slow, water demand is small, drought resistance time is long. The disadvantage is that the growth of plants is slow.

The water pipe connection 101 may also be arranged in the lower part of the water storage container 1. The advantages are as follows: the water level of each storage vessel is consistent, the evaporation area of water is large, and the plants grow luxuriantly. Its shortcoming is: the water evaporates quickly, the water demand is big, the water pipe connection place treatment is easy to leak easily.

The water pipe connection port 101 may also be provided in the middle portion of the water storage container 1, and the advantages and disadvantages are described above.

According to the amount of rainfall and the drought resistance of plants, the level of water pipe connection 101 is set.

There is no evaporating net connected to the funnel, the conduit on the evaporator can be covered through the hole 202.

Embodiment 5

Figure 38:
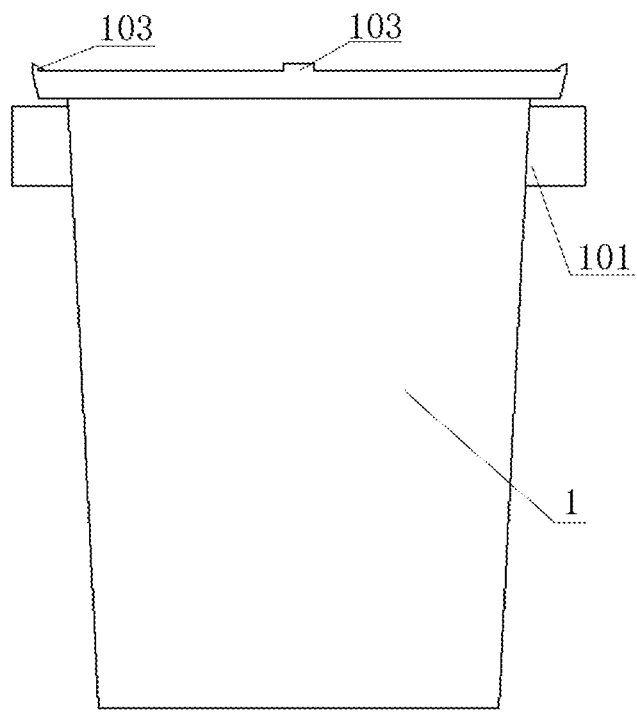
FIG. 38 is a front view schematic diagram of embodiment 5.
Figure 39:
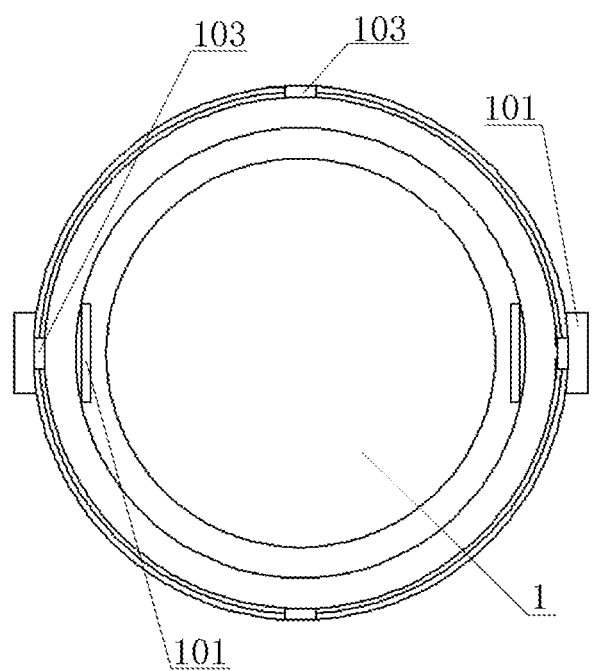
FIG. 39 is a top view of FIG. 38.
Figure 40:
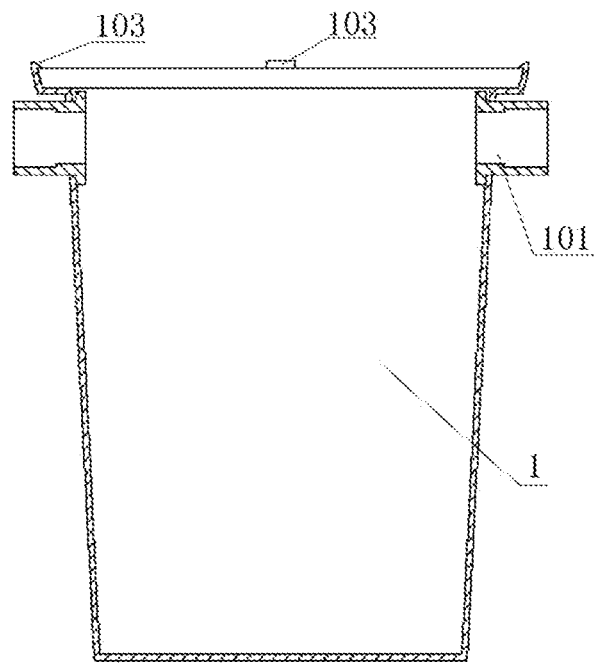
FIG. 40 is a cross-sectional front view of FIG. 38.

FIG. 38 is a schematic diagram of embodiment 5. FIG. 39 is a top view of FIG. 38. FIG. 40 is a cross-sectional view of FIG. 38. According to the embodiments described above. The upper end of the storage container 1 is provided with a lock hook 103. The lock hook 103 is a bulge with a barb, used to hook the evaporation net 2. Lock the storage container 1 and the evaporation net 2 together. Prevent displacement causing leakage of soil or sand between the two joints. The water storage container 1 and the evaporation net 2 can also be connected in other ways, such as threaded joint, binding, adhesive, screw fixation, etc.

Embodiment 6

Figure 41:
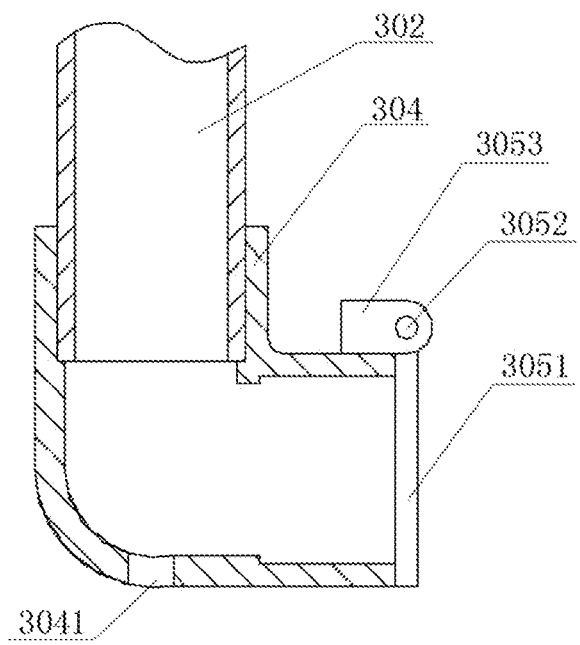
FIG. 41 is a cross-sectional schematic diagram of embodiment 6.
Figure 42:
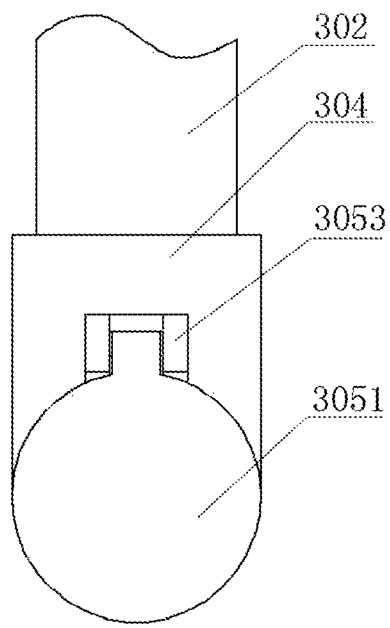
FIG. 42 is a right view of FIG. 41.
Figure 43:
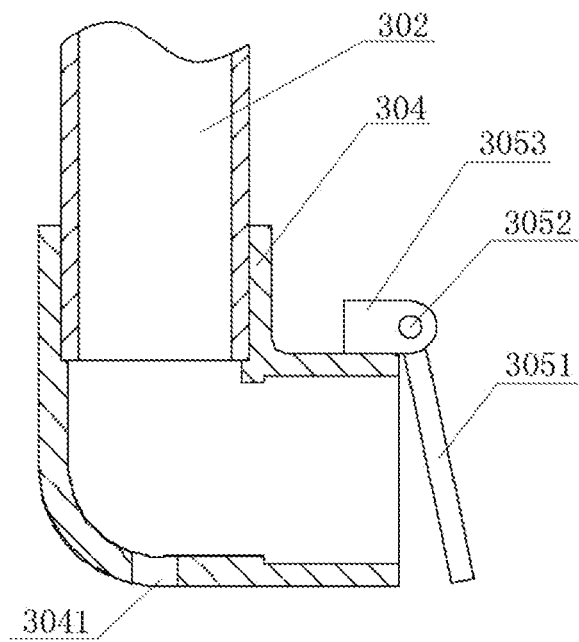
FIG. 43 is a schematic diagram of the sectional structure of the gravity type reverse switch 3051 on state.

FIG. 41 is a schematic diagram of embodiment 6. FIG. 42 is a right view of FIG. 41. According to the embodiments described above. The reverse stop switch on the outlet of the device for protecting plant survival can be gravity type reverse stop switch 3051. Gravity type reverse switch 3051 has hinge shaft 3052. The hinge shaft 3052 is mounted on the hinge seat 3053. The hinge seat 3053 is bonded to the elbow 304. The normal gravity type reverse stop switch 3051 covers the outlet of the elbow 304 under the action of gravity, preventing water vapor in the storage container 1 from evaporating into the atmosphere along the conduit 302. When rain water entered, the reverse stop switch 3051 was turned on under the impulse of water. FIG. 43 is a schematic diagram of the sectional structure of the gravity type reverse switch 3051 on state.

Embodiment 7

Figure 44:
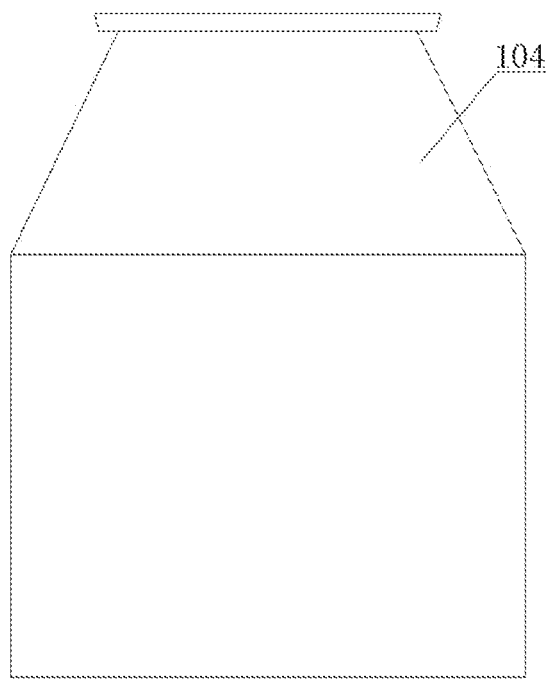
FIG. 44 is a structural diagram of a water storage container 104 having a bottom portion larger than the upper portion under embodiment 7.

FIG. 44 is a structural diagram of a water storage container 104 having a large bottom portion and an upper portion smaller than the bottom portion under embodiment 7. The water storage container of the above embodiment may be made into a lower large upper small storage container 104 in the form of a lower large upper small shape. Increase the amount of water stored and prolong the green time of the plant.

Embodiment 8

Figure 45:
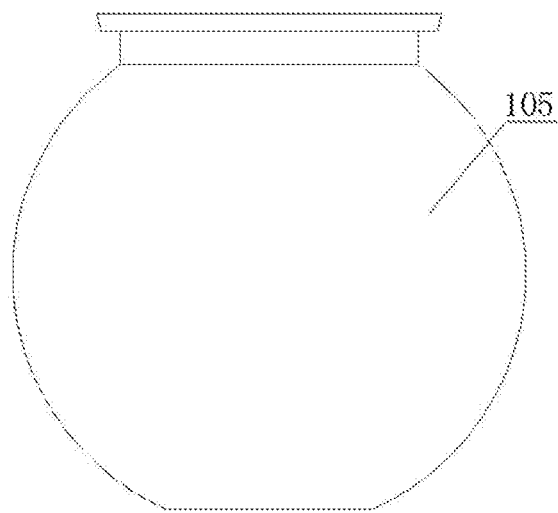
FIG. 45 is a structural diagram of embodiment 8 spherical storage container 105.

FIG. 45 is a structural diagram of embodiment 8 spherical storage container 105. The water storage containers of the above embodiments may also be made into spherical storage containers. Storage containers and evaporating nets can also be in the shape of canisters, ellipsoids, squares, polygons, etc.

Embodiment 9

Figure 46:
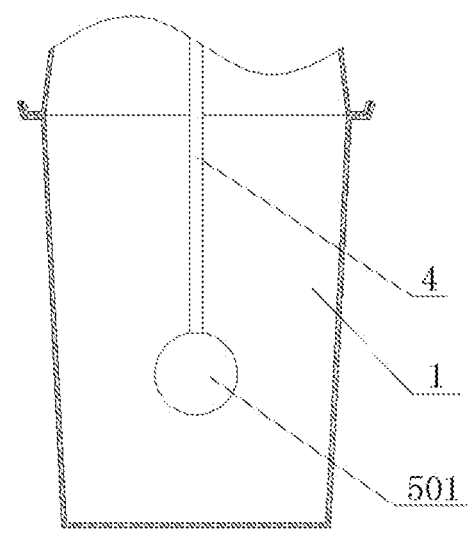
FIG. 46 is a structural diagram of embodiment 9 spherical float 501.

FIG. 46 is a structural diagram of embodiment 9 spherical float 501. The shape of the float in the above embodiment may be a spherical float in the shape of a ball. The shape of the float can also be elliptical, square, polygons and other shapes.

Embodiment 10

Figure 47:
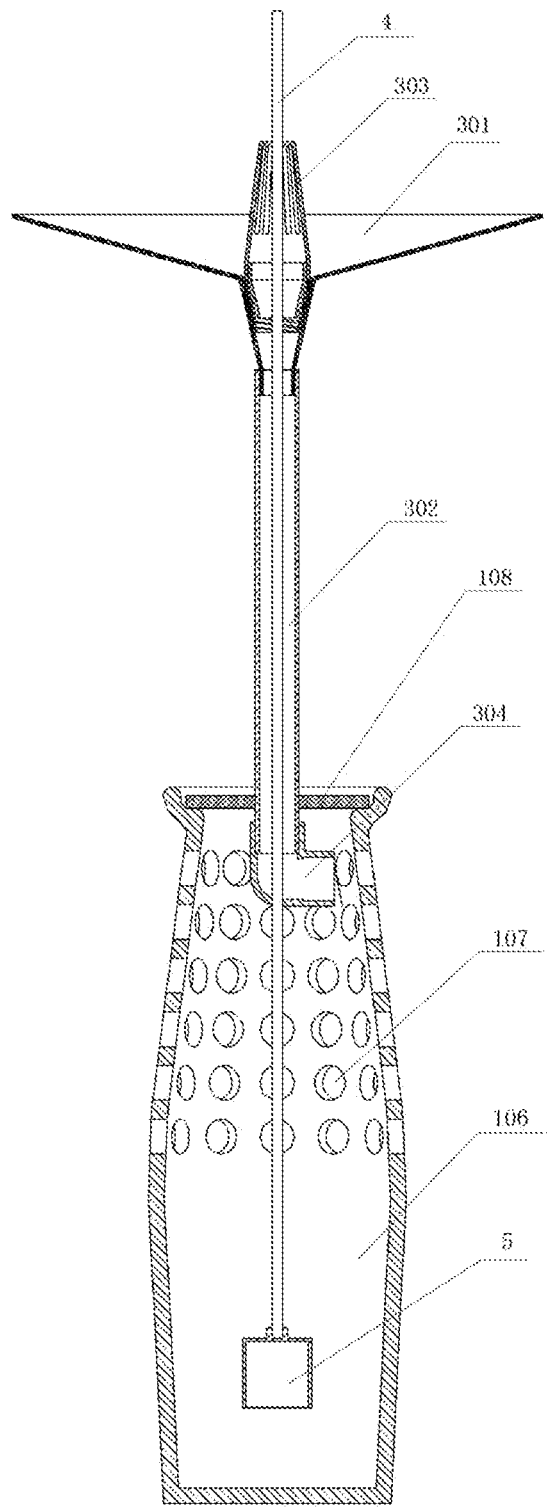
FIG. 47 is a structural diagram of embodiment 10.

FIG. 47 is a structural diagram of embodiment 10. A device to safeguard plant survival as described in embodiment 1 or embodiment 3. The water storage container 1 and the evaporation net 2 are integrated. Called: water storage evaporator 106. The upper end of the water storage evaporator 106 has a plurality of vent holes 107. The lower end of the water storage evaporator 106 is used for storing water, having the same function as the water storage container 1 and the evaporation net 2. Water storage evaporator 106 upper end covered 108. A duct hole is arranged on the cover 108. The water storage evaporator 106 is buried in the roots of the plant soil. The water at the lower end of the water storage evaporator 106 evaporates into the soil through the vent holes 107. The material of the water storage evaporator 106 may be plastic, ceramic, or similar to a tile tank, etc. In order to prevent the soil or sand from entering the water storage evaporator 106, the air permeable hole at the top of the storage evaporation tank can be covered with a gauze net.

The device of the disclosed device for protecting plant survival has the advantages of low use cost, convenient industrial manufacture, simple use, convenient transportation, etc. It is especially suitable for use in arid and water-scarce areas. After the use of the device, the plant can survive in the presence of continuous drought. The flowers and plants raised at home for a long time will not die. Economic trees and herbs such as fruit trees, poplars, pine trees, jujube trees, sandals, *Hippophae rhamnoides* and *Lycium barbarum* can be planted in large numbers in arid areas. Some arid desertification and desert areas can recommend planting trees, desert can become oasis, improve human living environment.

The above is only a specific embodiment of the disclosed device. But the scope of protection of the present disclosed device is not limited to this. Any changes or replacements carried out by the technical scheme disclosed by the disclosed device are covered by the protection scope of the disclosed device. The scope of protection of the disclosed device shall be based on the claim.

What is claimed is:

1. A device for aiding plant survival, the device comprising: a first water storage container, an evaporation cover, a funnel, an indicating rod and a float, wherein: the first water storage container is used for storing water, the first water storage container has the evaporation cover on top, the evaporation cover has a gas permeable structure, and the evaporation cover is connected to the funnel, the indicator rod is arranged in a leak tube of the funnel, a gap exists between the leak tube of the funnel and the indicator rod; a lower end of the indicator rod extends to the first water storage container and is connected with a float; the float drives the indicator rod to indicate a water level inside of the first water storage container, wherein the funnel has an inner thread buckle, the funnel with the inner thread buckle is provided with a filter tower, the outer end of the filter tower has an outer thread buckle, the filter tower has a filter hole at the upper end and the indicator rod passes through the hole; the funnel passes through a conduit and the evaporating cover is connected, and the lower end of the conduit is connected with an elbow; the other end of the elbow has a backstop on the water outlet, and after stopping the water injection, the water outlet is blocked to prevent the water in the first water storage container from evaporating to the atmosphere along the conduit; the elbow includes a through hole for receiving the indicator rod, and the indicator rod is connected to the float.

2. The device according to claim 1, wherein the inner thread buckle in the funnel is a tapered inner thread; the filter is provided in the funnel, and the lower end of the filter tower has a tapered external thread.

3. The device according to claim 1, wherein the first water storage container has a water pipe connection port, and wherein the first water storage container connects to at least a second water storage container by a water pipe through the water pipe connection port.

4. The device of claim 1, wherein the first water storage container and the evaporation cover are integrated, and is called a first water storage evaporator, wherein the upper end of the first water storage evaporator has a plurality of venting holes, wherein the lower end of the first water storage evaporator is used for storing water, and wherein the upper end of the first water storage evaporator has a cover with a conduit hole.

* * * * *